United States Patent
Kimura et al.

(10) Patent No.: US 12,116,454 B2
(45) Date of Patent: *Oct. 15, 2024

(54) METHOD FOR PRODUCING POLYALKYLENE OXIDE AND POLYALKYLENE OXIDE

(71) Applicant: SUMITOMO SEIKA CHEMICALS CO., LTD., Hyogo (JP)

(72) Inventors: Akira Kimura, Himeji (JP); Yuika Imamura, Himeji (JP)

(73) Assignee: SUMITOMO SEIKA CHEMICALS CO., LTD., Hyogo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/944,339

(22) Filed: Sep. 14, 2022

(65) Prior Publication Data

US 2023/0088981 A1   Mar. 23, 2023

(30) Foreign Application Priority Data

Sep. 15, 2021 (JP) .................................. 2021-150544

(51) Int. Cl.
| | | |
|---|---|---|
| *C08G 65/12* | (2006.01) | |
| *C08G 65/26* | (2006.01) | |
| *C08G 65/30* | (2006.01) | |
| *C08J 3/28* | (2006.01) | |
| *C08K 5/13* | (2006.01) | |

(52) U.S. Cl.
CPC ......... *C08G 65/12* (2013.01); *C08G 65/2609* (2013.01); *C08G 65/30* (2013.01); *C08J 3/28* (2013.01); *C08K 5/13* (2013.01); *C08G 2650/58* (2013.01); *C08J 2371/02* (2013.01)

(58) Field of Classification Search
CPC .......................... C08G 65/12; C08G 2650/58; C08G 65/2609; C08G 65/30; C08J 3/28; C08J 2371/02; C08K 5/13
See application file for complete search history.

(56) References Cited

U.S. PATENT DOCUMENTS 3,470,078 A * 9/1969 King .......................... C08J 3/28
                                                                        522/86
4,667,013 A   5/1987 Reichle

FOREIGN PATENT DOCUMENTS

JP         62-273227 A    11/1987

* cited by examiner

*Primary Examiner* — Rabon A Sergent
(74) *Attorney, Agent, or Firm* — Sughrue Mion, PLLC

(57) ABSTRACT

A method for producing a polyalkylene oxide includes a step of irradiating a high-molecular-weight polyalkylene oxide with radiation in the presence or absence of an antioxidant to obtain a polyalkylene oxide,
wherein
the high-molecular-weight polyalkylene oxide before irradiation has a viscosity at 25° C. in a 1 mass % aqueous solution of 1500 to 16000 mPa·s,
when the antioxidant is present, the antioxidant is present in an amount of less than 2000 mass ppm relative to the total mass of the high-molecular-weight polyalkylene oxide, and
the following formula (1):

$$0 \leq C^3 \times I \times 10^{-8} < 30 \qquad (1),$$

wherein
C is the concentration of the antioxidant used in the step, and represents the proportion (mass ppm) of the antioxidant relative to the total mass of the polyalkylene oxide, and I represents the irradiation dose (kGy) of the radiation emitted in the above step, is satisfied.

14 Claims, No Drawings

METHOD FOR PRODUCING POLYALKYLENE OXIDE AND POLYALKYLENE OXIDE

TECHNICAL FIELD

The present invention relates to a method for producing a polyalkylene oxide and a polyalkylene oxide.

BACKGROUND ART

Polyalkylene oxides have been applied in various applications because of their unique properties and low toxicity. For example, polyalkylene oxides are used for dispersion stabilizers, cosmetic additives, thickeners, raw materials for paper manufacturing, solid dosage form, ceramic binders, and battery materials. Polyalkylene oxides are materials whose use is extremely valuable.

Various methods for producing such polyalkylene oxides are known. For example, Patent Literature 1 discloses a technique for producing a polyalkylene oxide with a controlled molecular weight by performing a polymerization reaction of an alkylene oxide in the presence of a chain transfer agent. Also known is a technique in which the molecular chain is cleaved by irradiation of radiation, thus adjusting the molecular weight to the desired range in a method for producing a polyalkylene oxide.

CITATION LIST

Patent Literature

PTL 1: JP1987-273227A

SUMMARY OF INVENTION

Technical Problem

However, irradiation of a polyalkylene oxide with radiation as in the conventional production method is likely to cause a phenomenon of discoloration of a polyalkylene oxide. As a change in yellowing and whiteness in products containing a polyalkylene oxide is sometimes not preferable in terms of designability, the establishment of a technique of producing a polyalkylene oxide having suppressed yellow discoloration and high whiteness by a simple method is desired.

The present invention was made in view of the above, and aims to provide a production method that is capable of obtaining a polyalkylene oxide having high whiteness by a simple method, and a polyalkylene oxide.

Solution to Problem

As a result of extensive research to achieve the above object, the present inventors found that the above object can be achieved by limiting the amount of an antioxidant to a certain amount or by not using an antioxidant, and irradiating a high-molecular-weight polyalkylene oxide having a specific viscosity with radiation. The invention was thus accomplished.

Specifically, the present invention, for example, includes the following aspects.

Item 1

A method for producing a polyalkylene oxide, comprising a step of irradiating a high-molecular-weight polyalkylene oxide with radiation in the presence or absence of an antioxidant to obtain a polyalkylene oxide, wherein the high-molecular-weight polyalkylene oxide has a viscosity in a 1% aqueous solution of 1500 to 16000 mPa·s, when the antioxidant is present, the antioxidant is present in an amount of less than 2000 mass ppm relative to the total mass of the high-molecular-weight polyalkylene oxide, and the following formula (1):

$$0 \leq C^3 \times I \times 10^{-8} < 30 \qquad (1),$$

wherein

C is the concentration of the antioxidant used in the step, and represents the proportion (mass ppm) of the antioxidant relative to the total mass of the polyalkylene oxide, and I represents the irradiation dose (kGy) of the radiation emitted in the above step, is satisfied.

Item 2

The method for producing a polyalkylene oxide according to Item 1, wherein the antioxidant is at least one member selected from the group consisting of phenol antioxidants, amine antioxidants, organosulfur antioxidants, and phosphorus antioxidants.

Item 3

The method for producing a polyalkylene oxide according to Item 1, wherein the radiation is at least one member selected from the group consisting of electron ray, γ-ray, X-ray, and neutron ray.

Item 4

The method for producing a polyalkylene oxide according to Item 2, wherein the radiation is at least one member selected from the group consisting of electron ray, γ-ray, X-ray, and neutron ray.

Item 5

The method for producing a polyalkylene oxide according to Item 1, wherein the polyalkylene oxide obtained in the step has a b* value of 5 or less, and a viscosity in a 2% aqueous solution of 400 to 4000 mPa·s.

Item 6

The method for producing a polyalkylene oxide according to Item 2, wherein the polyalkylene oxide obtained in the above step has a b* value of 5 or less, and a viscosity in a 2% aqueous solution of 400 to 4000 mPa·s.

Item 7

The method for producing a polyalkylene oxide according to Item 3, wherein the polyalkylene oxide obtained in the step has a b* value of 5 or less, and a viscosity in a 2% aqueous solution of 400 to 4000 mPa·s.

Item 8

The method for producing a polyalkylene oxide according to Item 4, wherein the polyalkylene oxide obtained in the step has a b* value of 5 or less, and a viscosity in a 2% aqueous solution of 400 to 4000 mPa·s.

Item 9

The method for producing a polyalkylene oxide according to Item 1, wherein the polyalkylene oxide obtained in the step has a b* value of 5 or less, and a viscosity in a 5% aqueous solution of 30 to 22000 mPa·s.

Item 10

The method for producing a polyalkylene oxide according to Item 2, wherein the polyalkylene oxide obtained in the step has a b* value of 5 or less, and a viscosity in a 5% aqueous solution of 30 to 22000 mPa·s.

Item 11

The method for producing a polyalkylene oxide according to Item 3, wherein the polyalkylene oxide obtained in the step has a b* value of 5 or less, and a viscosity in a 5% aqueous solution of 30 to 22000 mPa·s.

Item 12

The method for producing a polyalkylene oxide according to Item 4, wherein the polyalkylene oxide obtained in the step has a b* value of 5 or less, and a viscosity in a 5% aqueous solution of 30 to 22000 mPa·s.

Item 13

A polyalkylene oxide having a b* value of 5 or less, and a viscosity in a 2% aqueous solution of 400 to 4000 mPa·s.

Item 14

A polyalkylene oxide having a b* value of 5 or less, and a viscosity in a 5% aqueous solution of 30 to 22000 mPa·s.

Advantageous Effects of Invention

According to the method for producing a polyalkylene oxide of the present invention, a polyalkylene oxide with high whiteness can be obtained by a simple method.

DESCRIPTION OF EMBODIMENTS

Embodiments of the present invention are described in detail below. In the present specification, the terms "comprising" and "containing" include "comprising," "containing," "consisting essentially of," and "consisting of."

In the numerical range described in stages in the present specification, the upper or lower limit of the numerical range at one stage can be optionally combined with the upper or lower limit of the numerical range at another stage. In the numerical range described in the present specification, the upper or lower limit of the numerical range may be replaced with a value shown in the Examples, or a value that can be uniquely derived from the Examples. Further, in the present specification, the numerical values connected by the term "to" mean the numerical range including the numerical values before and after the term "to" as the lower limit value and the upper limit value.

The method for producing a polyalkylene oxide of the present invention comprises a step of irradiating a high-molecular-weight polyalkylene oxide with radiation in the presence or absence of an antioxidant to obtain a polyalkylene oxide. In the step, the viscosity of the high-molecular-weight polyalkylene oxide in a 1% aqueous solution is 1500 to 16000 mPa·s; and the antioxidant, when present, is in an amount of less than 2000 mass ppm relative to the total mass of the high-molecular-weight polyalkylene oxide. The production method of the present invention satisfies the following formula (1):

$$0 \leq C^3 \times I \times 10^{-8} < 30 \quad (1),$$

wherein C is the concentration of the antioxidant used in the step, and represents the proportion (mass ppm) of the antioxidant relative to the total mass of the polyalkylene oxide, and I represents the irradiation dose (kGy) of radiation emitted in the step.

Hereinbelow, the step is referred to as "step A." Since the production method comprises at least step A, a polyalkylene oxide with high whiteness can be obtained by a simple method according to the production method.

The polyalkylene oxide obtained by the production method comprising step A can be referred to as a "medium-molecular-weight polyalkylene oxide" in order to distinguish it from the high-molecular-weight polyalkylene oxide used in step A.

Step A

Step A is a step of irradiating a high-molecular-weight polyalkylene oxide with radiation in the presence or absence of an antioxidant. By this step A, the desired medium-molecular-weight polyalkylene oxide can be obtained. The high-molecular-weight polyalkylene oxide used in step A has a higher molecular weight than the desired polyalkylene oxide, and it is a precursor of the desired medium-molecular-weight polyalkylene oxide.

The viscosity in a 1% aqueous solution of the high-molecular-weight polyalkylene oxide obtained in step A is 1500 to 16000 mPa·s. By this feature, the medium-molecular-weight polyalkylene oxide obtained in step A is less likely to turn yellow by irradiation of radiation, and the medium-molecular-weight polyalkylene oxide having high whiteness can be obtained. The viscosity in a 1% aqueous solution of the high-molecular-weight polyalkylene oxide used in step A is preferably 1600 mPa·s or more, and is more preferably 1700 mPa·s or more.

The viscosity of the high-molecular-weight polyalkylene oxide in a 1% aqueous solution is a value measured by the following method. 6 g of polyethylene oxide and 125 mL of isopropanol are added to a 1 L beaker. While the mixture is stirred at 300 to 400 rpm using a stirring blade, 594 g of ion-exchange water is added, followed by stirring for one minute. Thereafter, the stirring speed is changed to 60 rpm, and stirring is continued for an additional 3 hours to obtain an aqueous solution of 1% polyethylene oxide. The aqueous solution is kept at 25° C., and the viscosity is measured using a rotational viscometer (Brookfield "RV DVII+J"). The obtained value is referred to as a viscosity in a 1% aqueous solution.

The type of the high-molecular-weight polyalkylene oxide used in step A is not particularly limited as long as the viscosity in a 1% aqueous solution is 1500 to 16000 mPa·s. In a high-molecular-weight polyalkylene oxide, the number of carbon atoms in the alkylene moiety is not particularly limited. It is, for example, preferably 2 or more and 4 or less. Since the effects of the present invention are more easily exhibited, it is particularly preferred that the number of carbon atoms in the alkylene moiety is 2, i.e., that the high-molecular-weight polyalkylene oxide is a polyethylene oxide.

The high-molecular-weight polyalkylene oxide is generally a homopolymer; however, it is not limited thereto, and may be a copolymer. When the polyalkylene oxide is a copolymer, it, for example, has two or more structural units in which the number of carbons in the alkylene moiety is different.

The high molecular-weight-polyalkylene oxide can be produced by, for example, a known production method, or can be obtained from a commercially available product. For example, the high-molecular-weight polyalkylene oxide used in step A can be obtained by a polymerization reaction of alkylene oxide.

Examples of the alkylene oxide include aliphatic alkylene oxides. Specific examples include ethylene oxide, propylene oxide, and butylene oxide. The alkylene oxides can be used alone or in a combination of two or more. The alkylene oxide preferably contains at least ethylene oxide or propylene oxide, and more preferably ethylene oxide. It is also preferable that the alkylene oxide consist of ethylene oxide alone.

The polymerization reaction of alkylene oxide can be performed in the presence of a chain-transfer agent for adjusting the molecular weight, or the polymerization reaction of alkylene oxide can be performed in the absence of a chain-transfer agent, i.e., without using a chain transfer agent.

The type of the chain transfer agent is not particularly limited. For example, a known chain transfer agent used in the polymerization reaction of alkylene oxide can be used. Of these, if a chain transfer agent is used, the chain transfer agent preferably contains an alcohol compound. Such an alcohol compound is not particularly limited as long as the alcohol has a property of functioning as a chain transfer agent. The alcohol compound may be, for example, at least one member selected from the group consisting of methanol, ethanol, n-propanol, isopropanol, n-butanol, isobutanol, and t-butanol. Of these, the alcohol compound is at least one member selected from the group consisting of isopropanol and t-butanol.

When the chain transfer agent is used in the polymerization reaction of alkylene oxide, the amount of the chain transfer agent is not particularly limited, and can, for example, be in the same range as in the polymerization reaction of a known alkylene oxide.

The polymerization reaction of an alkylene oxide can be performed in a solvent. The solvent can be, for example, the same as those used in the well-known polymerization reaction of alkylene oxide. Examples of the solvent include aliphatic hydrocarbon solvents. Aliphatic hydrocarbons having a carbon number of 5 to 8 are preferred from the viewpoint of reducing the residual solvent after drying. Examples of aliphatic hydrocarbon solvents include 2-methylbutane, n-pentane, 2-methylpentane, n-hexane, cyclohexane, and n-heptane.

In the polymerization reaction of alkylene oxide, the amount of the solvent is not particularly limited. It is preferably 300 parts by mass or more, more preferably 400 parts by mass or more, and preferably 600 parts by mass or less, and more preferably 500 parts by mass or less, relative to 100 parts by mass of the alkylene oxide used.

In the polymerization reaction of alkylene oxide, the catalyst can be used as necessary. The type of the catalyst is not particularly limited, and can be, for example, the same as those used in the well-known polymerization reaction of alkylene oxide. Specifically, a metal catalyst such as zinc can be used. The amount of the catalyst is not particularly limited. It can be, for example, in the same range as in the known production method of polyalkylene oxide, and specifically about the amount of the catalyst.

The method of the polymerization reaction of alkylene oxide is not particularly limited. For example, the method used for the known polymerization reaction of alkylene oxide can be used. The temperature of a polymerization reaction is, for example, 30 to 70° C., preferably 30 to 60° C., and more preferably 35 to 50° C. The time for a polymerization reaction can be set according to the heating temperature; it is, for example, about 1 to 5 hours.

In step A, irradiation of radiation to a high-molecular-weight polyalkylene oxide is performed in the presence or absence of an antioxidant. When the irradiation of radiation is performed in the presence of an antioxidant, the irradiation of radiation is performed under the conditions such that the proportion of the antioxidant relative to the total mass of the high-molecular-weight polyalkylene oxide is less than 2000 mass ppm. Thus, by performing the irradiation of radiation to a high-molecular-weight polyalkylene oxide in the presence or absence of the antioxidant, the obtained medium-molecular-weight polyalkylene oxide is not likely to turn yellow, and the medium-molecular-weight polyalkylene oxide having high whiteness can be obtained.

The antioxidant herein means at least one antioxidant selected from the group consisting of phenolic antioxidants, amine antioxidants, organosulfur antioxidants, and phosphorus antioxidants. Since the proportion of the antioxidant is a specific amount or less, a medium-molecular-weight polyalkylene oxide with high whiteness can be obtained. When an antioxidant other than at least one member selected from the group consisting of phenolic antioxidants, amine antioxidants, organosulfur antioxidants, and phosphorus antioxidants is present in the irradiation of step A, the amount of all antioxidants, including that antioxidant, is preferably less than 2000 mass ppm relative to the total mass of the high-molecular-weight polyalkylene oxide. Examples of the antioxidant include dibutylhydroxytoluene (BHT).

In step A, when radiation irradiation is performed in the presence of an antioxidant, the proportion of the antioxidant is preferably 1995 mass ppm or less, more preferably 1990 mass ppm or less, even more preferably 1980 mass ppm or less, and particularly preferably 1970 mass ppm or less, relative to the total mass of the high-molecular-weight polyalkylene oxide (in this case, the proportion of the antioxidant may be 1500 mass ppm or less relative to the total mass of the high-molecular-weight polyalkylene oxide). In step A, radiation irradiation is preferably performed in the absence of an antioxidant.

The antioxidant is generally derived from an additive used in the polymerization reaction of the high-molecular-weight polyalkylene oxide. Specifically, the antioxidant is contained in the high-molecular-weight polyalkylene oxide. Alternatively, the antioxidant may be intentionally added after the completion of the polymerization reaction to prevent oxidation of the high-molecular-weight polyalkylene oxide, or the antioxidant may be unavoidably contained in the high-molecular-weight polyalkylene oxide.

The proportion of the antioxidant can be calculated from the additional amount of the antioxidant when the antioxidant is intentionally added to an antioxidant-free high-molecular-weight polyalkylene oxide. In contrast, when the proportion of the antioxidant is unclear, it can be analyzed by gas chromatography as follows. 1 g of the high-molecular-weight polyalkylene oxide in the sample is dispersed in 10 mL of n-hexane in a sample bottle, and the antioxidant is extracted into n-hexane by ultrasonic irradiation for 10 minutes in an ultrasonic cleaner to obtain an extract. The supernatant of the extract is measured by gas chromatography, and the proportion of the antioxidant in the polyalkylene oxide is determined from a calibration curve prepared from a standard solution obtained by dissolving the antioxidant with a predetermined concentration in n-hexane at a given concentration. Measurement is conducted using GC-2014 (produced by Shimadzu Corporation) under the conditions such that the column is G-250 (Chemicals Evaluation and Research Institute), the detector is FID, helium is used at 50 mL/min as a carrier gas, the column temperature is 150° C., the inlet temperature is 220° C., and the detector temperature is 250° C.

The method for adjusting the proportion of the antioxidant is not particularly limited. For example, the proportion of the antioxidant can be adjusted by a method of adjusting the amount of an antioxidant in the production of the high-molecular-weight polyalkylene oxide, a method of adding an antioxidant to the high-molecular-weight polyalkylene oxide, or a method of purifying the high-molecular-weight polyalkylene oxide to remove an antioxidant, thus adjusting the proportion of the antioxidant.

The type of radiation used in step A is not particularly limited. For example, gamma ray, X-ray, neutron ray, or the like can be used. Of these, gamma ray can be preferably used. For example, when gamma ray is used, the irradiation conditions are not particularly limited. The high-molecular-weight polyalkylene oxide is irradiated with gamma ray of 0.1 kGy or more, and preferably 0.2 kGy or more. The gamma-ray irradiation dose to be irradiated is preferably 30 kGy or less. The irradiation duration of radiation is not particularly limited, and can be suitably set according to the type of radiation. The irradiation of radiation can be performed, for example, using a known radiation irradiation apparatus.

In step A, the radiation is emitted to satisfy the following formula (1):

$$0 \leq C^3 \times I \times 10^{-8} < 30 \qquad (1).$$

In formula (1), C is the concentration of the antioxidant used in the step, and represents the proportion (mass ppm) of the antioxidant relative to the total mass of the polyalkylene oxide. In formula (1), I represents the irradiation dose (kGy) of radiation emitted in the step.

By performing irradiation of radiation under conditions satisfying formula (1) in step A, the obtained medium-molecular-weight polyalkylene oxide is less likely to turn yellow, and has high whiteness.

When the value of $C^3 \times I \times 10^{-8}$ in formula (1) is referred to as "K," the value K is preferably 30 or less, more preferably 10 or less, and even more preferably 5 or less.

The method for emitting radiation in step A is not particularly limited. For example, radiation can be emitted to a high-molecular-weight polyalkylene oxide in the solid state, such as powder, or to a high-molecular-weight polyalkylene oxide in the solution state. For the irradiation of radiation, the high-molecular-weight polyalkylene oxide can be contained in a space surrounded by a suitable material that does not block radiation, such as polyethylene, PET, an aluminum bag, and cardboard.

Irradiation of radiation in step A causes cleavage or the like of the high-molecular-weight polyalkylene oxide to produce the desired medium-molecular-weight polyalkylene oxide. After irradiation of radiation, an appropriate post-treatment can also be performed. For example, drying, curing, grinding, refining, and other various treatments can be performed, as necessary.

The medium-molecular-weight polyalkylene oxide obtained by the production method comprising the step A has high whiteness.

The medium-molecular-weight polyalkylene oxide obtained by the production method comprising the step A preferably has a b* value of 5 or less and a viscosity in a 2% aqueous solution of 400 to 4000 mPa·s. The medium-molecular-weight polyalkylene oxide, which has a b* value of 5 or less, has suppressed yellow discoloration and high whiteness. Further, the medium-molecular-weight polyalkylene oxide, which has a viscosity in a 2% aqueous solution of 400 to 4000 mPa·s, attains higher properties and excellent processability.

Alternatively, the medium-molecular-weight polyalkylene oxide obtained by the production method comprising the step A preferably has a b* value of 5 or less, and a viscosity in a 5% aqueous solution of 30 to 22000 mPa·s. The medium-molecular-weight polyalkylene oxide, which has a b* value of 5 or less, has suppressed yellow discoloration and high whiteness. Further, the medium-molecular-weight polyalkylene oxide, which has a viscosity in a 5% aqueous solution of 30 to 22000 mPa·s, attains higher properties and excellent processability. The medium-molecular-weight polyalkylene oxide obtained by the production method comprising step A has a b* value of 5 or less, a viscosity in a 2% aqueous solution of 400 to 4000 mPa·s, and a viscosity in a 5% aqueous solution of 30 to 22000 mPa·s.

The medium-molecular-weight polyalkylene oxide preferably has a b* value of 4 or less, even more preferably 2 or less, and particularly preferably 1 or less. It is further preferable that the medium-molecular-weight polyalkylene oxide has a viscosity in a 2% aqueous solution of 800 to 3000 mPa·s. It is further preferable that the medium-molecular-weight polyalkylene oxide has a viscosity in a 5% aqueous solution of 55 to 18000 mPa·s.

The b* value of the medium-molecular-weight polyalkylene oxide can be measured with a colorimeter. Herein, the more the b* value trends in the positive direction, the more the yellow discoloration proceeds; and the more the b* value trends in the negative direction, the stronger blue becomes.

The mass average molecular weight of the medium-molecular-weight polyalkylene oxide is not particularly limited. It is, for example, 200000 or more, preferably 500000 or more, more preferably 1000000 or more, even more preferably 1200000 or more, and particularly preferably 1500000 or more. The mass average molecular weight of the medium molecular weight polyalkylene oxide is, for example, 2500000 or less. The mass average molecular weight of the polyalkylene oxide herein means a value measured by gel permeation chromatography, in particular, a value calculated from a calibration curve prepared using a known polyethylene oxide standard sample.

The form of the medium-molecular-weight polyalkylene oxide obtained by the above production method is not particularly limited. The medium-molecular-weight polyalkylene oxide can take various forms, such as powder, granules, lumps, and pellets.

Since the medium-molecular-weight polyalkylene oxide obtained by the above production method has suppressed yellow discoloration and high whiteness, it can be suitably used for applications requiring a polyalkylene oxide with such properties. For example, the medium-molecular-weight polyalkylene oxide obtained by the above production method can be suitably used for a solid preparation, an aqueous adhesive, or the like. In particular, a polyalkylene oxide having a b* value of 5 or less and a viscosity in a 2% aqueous solution of 400 to 4000 mPa·s, or a polyalkylene oxide having a b* value of 5 or less and a viscosity in a 5% aqueous solution of 30 to 22000 mPa·s are preferable for the aforementioned applications.

By the production method comprising step A, the medium-molecular-weight polyalkylene oxide having suppressed yellow discoloration and high whiteness can be obtained by the production method comprising step A, step A is preferable as a method for suppressing the yellow discoloration of a medium-molecular-weight polyalkylene oxide or a method for increasing whiteness.

EXAMPLES

The present invention is described in more detail below by means of examples; however, the present invention is not limited to the embodiments of the examples.

Production Example 1

Production of Zinc Catalyst

After the inside of a round-bottom flask with an inner diameter of 80 mm and a capacity of 500 mL, equipped with a cooler, a dropping funnel, a nitrogen gas inlet tube, and a stirring blade with four (45° inclined) paddle blades with a blade diameter of 53 mm, was replaced with nitrogen, 87.1 g of n-hexane and 9.90 g of diethylzinc ($Et_2Zn$) were added to this flask. While the inner temperature of the flask was maintained at 20° C., and the inside of the flask was stirred at a tip peripheral speed of 0.97 m/sec (stirring speed: 350 rpm), 11.03 g (0.240 mol) of ethyl alcohol (EtOH) was added dropwise at 0.2 g/min as the first stage to perform a reaction, thus obtaining a reaction solution. Subsequently, as the second stage, a mixture comprising 6.49 g (0.072 mol) of 1,4-butanediol (1,4-BDO) and 13.27 g (0.288 mol) of ethyl alcohol was added dropwise at a rate of 0.2 g/min into the reaction solution that had been cooled to 10° C. After completion of the dropwise addition, the inside of the flask was heated to 30° C., and then further reacted for 1 hour. Subsequently, the temperature was increased to 50° C. to perform reaction for 1 hour. Thereafter, by distillation in which the flask was heated to 80° C., an unreacted component was removed. After the distillation, the inside of the flask was allowed to cool to room temperature; then, 52.4 g of n-hexane was added to the flask, followed by heating to 80° C., thus performing the second distillation. This operation was performed one more time, thus performing distillation for a total of three times. Thereafter, the resultant was cooled and diluted with 264 g of n-hexane to obtain 297 g of a zinc catalyst with a zinc content of 1.8 mass %.

Production Example 2-1

Production of High-Molecular-Weight Polyalkylene Oxide

After the inside of a pressure-resistant reaction vessel with an inner diameter of 94 mm and a capacity of 1 L, equipped with a dropping funnel, a nitrogen gas inlet tube, and a stirring blade with an anchor-type paddle blade with a blade diameter of 47 mm as a stirrer, was fully replaced with nitrogen, 340 g of n-hexane was placed in the pressure-resistant reaction vessel, and 0.975 g (zinc equivalent: 0.0004 mol) of the zinc catalyst obtained in Production Example 1 was uniformly dispersed in the n-hexane to obtain a dispersion. After 0.0884 g (0.0012 mol) of t-butanol and 81 g (1.84 mol) of ethylene oxide were added to the dispersion, the vessel was tightly closed, and a polymerization reaction was performed at 40° C. with stirring. In the polymerization reaction, the amount of the chain-transfer agent is 1091 mass ppm relative to ethylene oxide. The white product obtained by the polymerization reaction was separated by filtration, followed by drying under reduced pressure at 40° C. to give 81.0 g of a high-molecular weight polyethylene oxide. The viscosity in a 1% aqueous solution of the high-molecular-weight polyalkylene oxide was 1970 mPa·s.

Production Example 2-2

Production of High-Molecular-Weight Polyalkylene Oxide

A high-molecular-weight polyalkylene oxide was produced in the same manner as in Production Example 2-1 to obtain a high-molecular-weight polyalkylene oxide with a viscosity in a 1% aqueous solution of 1930 mPa·s.

Production Example 2-3

Production of High-Molecular-Weight Polyalkylene Oxide

The high-molecular-weight polyalkylene oxide was produced in the same manner as in Production Example 2-1, thus obtaining a high-molecular-weight polyalkylene oxide having a viscosity in a 1% aqueous solution of 2030 mPa·s.

Production Example 2-4

Production of High-Molecular-Weight Polyalkylene Oxide

A high-molecular-weight polyalkylene oxide was produced in the same manner as in Production Example 2-1, thus obtaining a high-molecular-weight polyalkylene oxide having a viscosity in a 1% aqueous solution of 1890 mPa·s.

Production Example 2-5

Production of High-Molecular-Weight Polyalkylene Oxide

The high-molecular-weight polyalkylene oxide was produced in the same manner as in Production Example 2-1, thus obtaining a high-molecular-weight polyalkylene oxide having a viscosity in a 1% aqueous solution of 2720 mPa·s.

Production Example 2-6

Production of High-Molecular-Weight Polyalkylene Oxide

The high-molecular-weight polyalkylene oxide was produced in the same manner as in Production Example 2-1, thus obtaining a high-molecular-weight polyalkylene oxide having a viscosity in a 1% aqueous solution of 1760 mPa·s.

Production Example 2-7

Production of High-Molecular-Weight Polyalkylene Oxide

The high-molecular-weight polyalkylene oxide was produced in the same manner as in Production Example 2-1, thus obtaining a high-molecular-weight polyalkylene oxide with a viscosity in a 1% aqueous solution of 2620 mPa·s.

Production Example 2-8

Production of High-Molecular-Weight Polyalkylene Oxide

After the inside of a pressure-resistant reaction vessel with an inner diameter of 94 mm and a capacity of 1 L, equipped with a dropping funnel, a nitrogen gas inlet tube, and a stirring blade with an anchor-type paddle blade with a blade diameter of 47 mm as a stirrer, was fully replaced with nitrogen, 340 g of n-hexane was placed in the pressure-resistant reaction vessel, and 0.975 g (zinc equivalent: 0.0004 mol) of the zinc catalyst obtained in Production Example 1 was uniformly dispersed in the n-hexane to obtain a dispersion. After 81 g (1.84 mol) of ethylene oxide was added to the dispersion, the vessel was tightly closed and maintained at 40° C. Thus, a polymerization reaction was performed while stirring the mixture. The white product obtained by the polymerization reaction was separated by filtration, followed by drying under reduced pressure at 40° C. to give 81.0 g of a high-molecular-weight polyethylene oxide. The viscosity of the obtained high-molecular-weight polyalkylene oxide in a 1% aqueous solution was 12840 mPa·s.

Example 1

By irradiating 40.0 g of the high-molecular weight polyethylene oxide (free of an antioxidant) obtained in Production Example 2-1 with 0.2 kGy of gamma ray, the desired medium-molecular-weight polyethylene oxide was obtained. Gamma-ray irradiation was performed with high-molecular-weight polyethylene oxide powder contained in a nylon/low density polyethylene bag, and Cobalt 60 gamma irradiation facility No. 1 (RIC1), produced by Radia Industry Co., Ltd., was used as an irradiation apparatus.

Example 2

The desired medium-molecular-weight polyethylene oxide was obtained in the same manner as in Example 1, except that 0.5 kGy of gamma ray was emitted.

Example 3

By adding dibutyl hydroxytoluene (BHT) as an antioxidant to 40.0 g of the high-molecular-weight polyethylene oxide obtained in Production Example 2-2, a high-molecular-weight polyethylene oxide containing the antioxidant was prepared. The amount of the antioxidant was set to 200 mass ppm relative to the high-molecular-weight polyethylene oxide. The obtained high-molecular-weight polyethylene oxide containing the antioxidant was irradiated with 0.2 kGy of gamma ray to obtain the desired medium-molecular-weight polyethylene oxide.

Example 4

The desired medium-molecular-weight polyethylene oxide was obtained in the same manner as in Example 3, except that 0.7 kGy of gamma ray was emitted.

Example 5

By adding BHT as an antioxidant to 40.0 g of the high-molecular-weight polyethylene oxide obtained in Production Example 2-3, a high-molecular-weight polyethylene oxide containing the antioxidant was prepared. The amount of the antioxidant was set to 200 mass ppm relative to the high-molecular-weight polyethylene oxide. The obtained high-molecular-weight polyethylene oxide containing the antioxidant was irradiated with 1.2 kGy of gamma ray to obtain the desired medium-molecular-weight polyethylene oxide.

Example 6

The desired medium-molecular-weight polyethylene oxide was obtained in the same manner as in Example 5, except that 8.0 kGy of gamma ray was emitted.

Example 7

By adding BHT as an antioxidant to 40.0 g of the high-molecular-weight polyethylene oxide obtained in Production Example 2-4, a high-molecular-weight polyethylene oxide containing the antioxidant was prepared. The amount of the antioxidant was set to 600 mass ppm relative to the high-molecular-weight polyethylene oxide. The obtained high-molecular-weight polyethylene oxide containing the antioxidant was irradiated with 1.0 kGy of gamma ray to obtain the desired medium-molecular-weight polyethylene oxide.

Example 8

The desired medium-molecular-weight polyethylene oxide was obtained in the same manner as in Example 7, except that 2.5 kGy of gamma ray was emitted.

Example 9

By adding BHT as an antioxidant to 40.0 g of the high-molecular-weight polyethylene oxide obtained in Production Example 2-5, a high-molecular-weight polyethylene oxide containing the antioxidant was prepared. The amount of the antioxidant was set to 800 mass ppm relative to the high-molecular-weight polyethylene oxide. The obtained high-molecular-weight polyethylene oxide containing the antioxidant was irradiated with 1.0 kGy of gamma ray to obtain the desired medium-molecular-weight polyethylene oxide.

Example 10

The desired medium-molecular-weight polyethylene oxide was obtained in the same manner as in Example 9, except that 2.0 kGy of gamma ray was emitted.

Example 11

By adding BHT as an antioxidant to 40.0 g of the high-molecular-weight polyethylene oxide obtained in Production Example 2-6, a high-molecular-weight polyethylene oxide containing the antioxidant was prepared. The amount of the antioxidant was set to 1200 mass ppm relative to the high-molecular-weight polyethylene oxide. The obtained high-molecular-weight polyethylene oxide containing an antioxidant was irradiated with 1.5 kGy of gamma ray to obtain the desired medium-molecular-weight polyethylene oxide.

Comparative Example 1

The desired medium-molecular-weight polyethylene oxide was obtained in the same manner as in Example 11, except that 2.0 kGy of gamma ray was emitted.

Comparative Example 2

By adding BHT as an antioxidant to 40.0 g of the high-molecular-weight polyethylene oxide obtained in Production Example 2-7, a high-molecular-weight polyethylene oxide containing the antioxidant was prepared. The amount of the antioxidant was set to 2000 mass ppm relative to the high-molecular-weight polyethylene oxide. The obtained high-molecular-weight polyethylene oxide containing the antioxidant was irradiated with 1.5 kGy of gamma ray to obtain the desired medium-molecular-weight polyethylene oxide.

Comparative Example 3

The desired medium-molecular-weight polyethylene oxide was obtained in the same manner as in Comparative Example 2, except that 2.0 kGy of gamma ray was emitted.

Example 12

By adding BHT as an antioxidant to 40.0 g of the high-molecular-weight polyethylene oxide obtained in Production Example 2-8, a high-molecular-weight polyethylene oxide containing the antioxidant was prepared. The amount of the antioxidant was set to 500 mass ppm relative to the high-molecular-weight polyethylene oxide. The obtained high-molecular-weight polyethylene oxide containing the antioxidant was irradiated with 1.7 kGy of gamma ray to obtain the desired medium-molecular-weight polyethylene oxide.

Example 13

The desired medium-molecular-weight polyethylene oxide was obtained in the same manner as in Example 12, except that 2.5 kGy of gamma ray was emitted.

Example 14

The desired medium-molecular-weight polyethylene oxide was obtained in the same manner as in Example 12, except that 3.0 kGy of gamma ray was emitted.

Example 15

The desired medium-molecular-weight polyethylene oxide was obtained in the same manner as in Example 12, except that 23 kGy of gamma ray was emitted.

Table 1 shows the viscosity in a 1% aqueous solution of the high-molecular-weight polyethylene oxide used in each of the Examples and Comparative Examples, and the proportion of the antioxidant (BHT), as well as the gamma-ray irradiation dose in the irradiation of radiation, and the value K (i.e., the value of $C^3 \times I \times 10^{-8}$) in formula (1) above. Table 1 shows the results of the viscosity in a 2% aqueous solution, the viscosity in a 5% aqueous solution, and the b* value of the medium-molecular-weight polyethylene oxide obtained in each of the Examples and Comparative Examples.

Table 1 clearly indicates that by irradiating a high-molecular-weight polyalkylene oxide having a specific viscosity with radiation in the presence or absence of a specific amount of an antioxidant under the conditions of $0 \leq K < 30$, a polyalkylene oxide having high whiteness can be easily obtained.

The following methods are used for evaluation.
Viscosity in 1% Aqueous Solution 6 g of polyethylene oxide and 125 mL of isopropanol were added to a 1 L beaker, and 594 g of ion exchange water was added under stirring the mixture at 300 to 400 rpm using a stirring blade, followed by stirring for one minute. Thereafter, the stirring speed was changed to 60 rpm, and stirring was continued for an additional 3 hours to obtain a solution of 1% polyethylene oxide. The solution was maintained at 25° C. The viscosity was measured using a rotational viscometer (Brookfield "RV-DVII+"), and the value was defined as the viscosity in a 1% aqueous solution.

Viscosity in 2% Aqueous Solution

The viscosity was measured in the same manner as in the measurement of the viscosity in a 1% aqueous solution, except that the amount of polyethylene oxide was changed to 12 g and the amount of ion-exchanged water was changed to 588 g. The obtained value was defined as a viscosity in a 2% aqueous solution.

Viscosity in 5% Aqueous Solution

The viscosity was measured in the same manner as in the measurement of the viscosity in a 1% aqueous solution, except that the amount of polyethylene oxide was changed

TABLE 1

| Example/Comparative Example | High-molecular-weight polyethylene oxide | | Gamma-ray irradiation condition | | | Medium-molecular-weight polyethylene oxide | | |
|---|---|---|---|---|---|---|---|---|
| | Viscosity in 1% aqueous solution (mPa·s) | Proportion of antioxidant (mass ppm) | Radiation dose (kGy) | Value K | b* | Viscosity in 2% aqueous solution (mPa·s) | Viscosity in 5% aqueous solution (mPa·s) |
| Example 1 | 1970 | 0 | 0.2 | 0 | 0.5 | 2740 | — |
| Example 2 | 1970 | 0 | 0.5 | 0 | 0.5 | 900 | — |
| Example 3 | 1930 | 200 | 0.2 | 0 | 0.5 | 3250 | — |
| Example 4 | 1930 | 200 | 0.7 | 0 | 0.7 | 720 | — |
| Example 5 | 2030 | 200 | 1.2 | 0 | 0.7 | — | 21450 |
| Example 6 | 2030 | 200 | 8.0 | 1 | 2.1 | — | 40 |
| Example 7 | 1890 | 600 | 1.0 | 2 | 1.0 | 970 | — |
| Example 8 | 1890 | 600 | 2.5 | 5 | 1.6 | — | 9900 |
| Example 9 | 2720 | 800 | 1.0 | 5 | 2.1 | 940 | — |
| Example 10 | 2720 | 800 | 2.0 | 10 | 4.0 | — | 11550 |
| Example 11 | 1760 | 1200 | 1.5 | 26 | 3.7 | 500 | — |
| Comparative Example 1 | 1760 | 1200 | 2.0 | 35 | 6.1 | — | 11000 |
| Comparative Example 2 | 2620 | 2000 | 1.5 | 120 | 6.5 | 510 | — |
| Comparative Example 3 | 2620 | 2000 | 2.0 | 160 | 9.7 | — | 12100 |
| Example 12 | 12840 | 500 | 1.7 | 2 | 0.3 | 2590 | — |
| Example 13 | 12840 | 500 | 2.5 | 3 | 1.8 | 490 | — |
| Example 14 | 12840 | 500 | 3 | 4 | 2.0 | — | 18000 |
| Example 15 | 12840 | 500 | 23 | 29 | 2.9 | — | 65 | to 30 g and the amount of ion-exchanged water was changed to 570 g. The obtained value was defined as a viscosity in a 5% aqueous solution.

b* Value

The b* value of the medium-molecular-weight polyethylene oxide was measured using a colorimeter (produced by Nippon Denshoku Kogyo Co., Ltd., ZE 6000, reflection method).

The invention claimed is:

1. A method for producing a polyalkylene oxide, comprising
a step of irradiating a high-molecular-weight polyalkylene oxide with radiation in the presence or absence of an antioxidant to obtain a polyalkylene oxide,
wherein
the high-molecular-weight polyalkylene oxide before irradiation has a viscosity at 25° C. in a 1 mass % aqueous solution of 1500 to 16000 mPa·s, the mass % aqueous solution being the mass percentage of the high-molecular-weight polyalkylene oxide based on the total mass of the high-molecular-weight polyalkylene oxide and water,
when the antioxidant is present, the antioxidant is present in an amount of less than 2000 mass ppm relative to the total mass of the high-molecular-weight polyalkylene oxide, and
the following formula (1):

$$0 \leq C^3 \times I \times 10^{-8} < 30 \quad (1),$$

wherein
C is the concentration of the antioxidant used in the above step, and represents the proportion (mass ppm) of the antioxidant relative to the total mass of the polyalkylene oxide, and I represents the irradiation dose (kGy) of the radiation emitted in the above step,
is satisfied.

2. The method for producing a polyalkylene oxide according to claim 1, wherein the antioxidant is at least one member selected from the group consisting of phenol antioxidants, amine antioxidants, organosulfur antioxidants, and phosphorus antioxidants.

3. The method for producing a polyalkylene oxide according to claim 1, wherein the radiation is at least one member selected from the group consisting of electron ray, γ-ray, X-ray, and neutron ray.

4. The method for producing a polyalkylene oxide according to claim 2, wherein the radiation is at least one member selected from the group consisting of electron ray, γ-ray, X-ray, and neutron ray.

5. The method for producing a polyalkylene oxide according to claim 1, wherein the polyalkylene oxide obtained in the above step has a b* value measured by a colorimeter using a reflection method of 5 or less, and a viscosity at 25° C. in a 2 mass % aqueous solution of 400 to 4000 mPa·s, the mass % aqueous solution being the mass percentage of the polyalkylene oxide based on the total mass of the polyalkylene oxide and water.

6. The method for producing a polyalkylene oxide according to claim 2, wherein the polyalkylene oxide obtained in the above step has a b* value measured by a colorimeter using a reflection method of 5 or less, and a viscosity at 25° C. in a 2 mass % aqueous solution of 400 to 4000 mPa·s, the mass % aqueous solution being the mass percentage of the polyalkylene oxide based on the total mass of the polyalkylene oxide and water.

7. The method for producing a polyalkylene oxide according to claim 3, wherein the polyalkylene oxide obtained in the above step has a b* value measured by a colorimeter using a reflection method of 5 or less, and a viscosity at 25° C. in a 2 mass % aqueous solution of 400 to 4000 mPa·s, the mass % aqueous solution being the mass percentage of the polyalkylene oxide based on the total mass of the polyalkylene oxide and water.

8. The method for producing a polyalkylene oxide according to claim 4, wherein the polyalkylene oxide obtained in the above step has a b* value measured by a colorimeter using a reflection method of 5 or less, and a viscosity at 25° C. in a 2 mass % aqueous solution of 400 to 4000 mPa·s, the mass % aqueous solution being the mass percentage of the polyalkylene oxide based on the total mass of the polyalkylene oxide and water.

9. The method for producing a polyalkylene oxide according to claim 1, wherein the polyalkylene oxide obtained in the above step has a b* value measured by a colorimeter using a reflection method of 5 or less, and a viscosity at 25° C. in a 5 mass % aqueous solution of 30 to 22000 mPa·s, the mass % aqueous solution being the mass percentage of the polyalkylene oxide based on the total mass of the polyalkylene oxide and water.

10. The method for producing a polyalkylene oxide according to claim 2, wherein the polyalkylene oxide obtained in the above step has a b* value measured by a colorimeter using a reflection method of 5 or less, and a viscosity at 25° C. in a 5 mass % aqueous solution of 30 to 22000 mPa·s, the mass % aqueous solution being the mass percentage of the polyalkylene oxide based on the total mass of the polyalkylene oxide and water.

11. The method for producing a polyalkylene oxide according to claim 3, wherein the polyalkylene oxide obtained in the above step has a b* value measured by a colorimeter using a reflection method of 5 or less, and a viscosity at 25° C. in a 5 mass % aqueous solution of 30 to 22000 mPa·s, the mass % aqueous solution being the mass percentage of the polyalkylene oxide based on the total mass of the polyalkylene oxide and water.

12. The method for producing a polyalkylene oxide according to claim 4, wherein the polyalkylene oxide obtained in the step has a b* value measured by a colorimeter using a reflection method of 5 or less, and a viscosity at 25° C. in a 5 mass % aqueous solution of 30 to 22000 mPa·s, the mass % aqueous solution being the mass percentage of the polyalkylene oxide based on the total mass of the polyalkylene oxide and water.

13. A polyalkylene oxide having a b* value measured by a colorimeter using a reflection method of 5 or less, and a viscosity at 25° ° C. in a 2 mass % aqueous solution of 400 to 4000 mPa·s, the mass % aqueous solution being the mass percentage of the polyalkylene oxide based on the total mass of the polyalkylene oxide and water.

14. A polyalkylene oxide having a b* value measured by a colorimeter using a reflection method of 5 or less, and a viscosity at 25° C. in a 5 mass % aqueous solution of 30 to 22000 mPa·s, the mass % aqueous solution being the mass percentage of the polyalkylene oxide based on the total mass of the polyalkylene oxide and water.

* * * * *